United States Patent
Lin et al.

(10) Patent No.: US 6,832,344 B2
(45) Date of Patent: Dec. 14, 2004

(54) MONITOR SYSTEM

(75) Inventors: Peter Lin, Hsinchu (TW); Te-Hsun Huang, Hsinchu (TW); Huang Ching Chi, Hsinchu (TW); Wen Chi Fang, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 524 days.

(21) Appl. No.: 09/864,428

(22) Filed: May 23, 2001

(65) Prior Publication Data

US 2002/0120889 A1 Aug. 29, 2002

(30) Foreign Application Priority Data

Feb. 23, 2001 (TW) .......................................... 90104261

(51) Int. Cl.⁷ .............................................. G06F 11/00
(52) U.S. Cl. .......................................... 714/48; 714/57
(58) Field of Search ...................... 714/48, 57

(56) References Cited

U.S. PATENT DOCUMENTS

| 5,388,251 | A | * | 2/1995 | Makino et al. | ............... 714/57 |
|---|---|---|---|---|---|
| 5,835,885 | A | * | 11/1998 | Lin | ............... 702/99 |
| 6,192,490 | B1 | * | 2/2001 | Gross | ............... 714/47 |
| 6,384,848 | B1 | * | 5/2002 | Kojima et al. | ............... 345/808 |
| 6,393,559 | B1 | * | 5/2002 | Alexander | ............... 713/2 |
| 6,657,548 | B2 | * | 12/2003 | Dai | ............... 340/815.45 |
| 6,731,206 | B2 | * | 5/2004 | Yang et al. | ............... 340/500 |
| 2002/0062437 | A1 | * | 5/2002 | Shin et al. | ............... 713/2 |
| 2002/0144191 | A1 | * | 10/2002 | Lin | ............... 714/46 |
| 2003/0163765 | A1 | * | 8/2003 | Eckardt et al. | ............... 714/36 |

OTHER PUBLICATIONS

Computer Hardware Additional information on computer POST/Beep Codes http://www.computerhope.com/beep.htm.*

* cited by examiner

Primary Examiner—Robert Beausoliel
Assistant Examiner—Michael Maskulinski

(57) ABSTRACT

A method for transmitting a sound signal to report an event represented by the sound signal is disclosed. The method includes steps of receiving at least one signal in response to the event, recording the at least one signal in a first recorder in sequence, and accessing the at least one signal in sequence and reporting the event by transmitting the sound signal according to sound data corresponding to the at least one signal pre-recorded in a second recorder.

21 Claims, 2 Drawing Sheets

MONITOR SYSTEM

FIELD OF THE INVENTION

The present invention relates to a method for transmitting a sound signal, and more particularly to a method for transmitting a sound signal to report a precise problem in the computer.

BACKGROUND OF THE INVENTION

Generally, the hardware monitor of a personal computer generates sounds of beep when the computer has some failure, for example, the CPU is overheated, the motherboard is overheated, the CPU is undervoltaged, the motherboard is undervoltaged, the fan is out of order, or the memory is not accurately inserted into the motherboard. However, the user could not know the real problem occurred in the computer according to the sounds of beep generated from the hardware monitor.

In addition, the different problem of the personal computer are conventionally reported by using different combination of lights generated from light-emitting diode (LED) or different types and different frequency of sounds. The combination of lights and the types and the frequency of sounds are different because they are produced from different manufacturer. It is difficult and inconvenient for the user to know the real problem occurred in the computer.

Furthermore, when the computer is down or turned off, the lights and the sounds of beep could not be generated to report the failure in the computer.

Therefore, the present invention provides a method for transmitting a sound signal to report an event represented by the sound signal to overcome the foresaid drawbacks.

SUMMARY OF THE INVENTION

It is an object of the present invention to provide a method for transmitting a sound signal to report an event represented by the sound signal.

In accordance with the present invention, the method includes steps of receiving at least one signal in response to the event, recording the at least one signal in a first recorder in sequence, and accessing the at least one signal in sequence and reporting the event by transmitting the sound signal according to sound data corresponding to the at least one signal pre-recorded in a second recorder.

In addition, the at least one signal is transmitted from one selected from a group consisting of a hardware monitor, a BIOS (basic input/output system), a motherboard and the combination thereof.

The at least one signal recorded and accessed in the first recorder is controlled by a manner of FIFO (first in, first out). When the sound signal is transmitted, a new signal is accessed simultaneously in the first recorder by a manner of FIFO (first in, first out).

Preferably, the first recorder is a first memory.

Preferably, the first memory is a queue.

In accordance with the present invention, the event is one at least selected from a group consisting of an overheated CPU (central processing unit), an undervoltaged CPU, an overheated motherboard, an undervoltaged motherboard, and failure of a fan disposed on the motherboard.

When the sound signal is transmitted, the at least one signal is automatically eliminated.

In addition, the at least one signal is accessed by a controller.

The sound data corresponding to the at least one signal and recorded in the second recorder are further accessed and transmitted to a speech circuit by the controller, thereby transmitting the sound signal to report the event.

The sound data recorded in the second recorder are accessed by the controller with software, and the sound signal reporting the event is transmitted via an on-line program.

Preferably, the second recorder is a hard disk.

Preferably, the second recorder is a second memory.

Moreover, the sound signal is changed to sounds of different sentences in different languages with an on-line program via a chip.

It is another object of the present invention to provide a monitor system capable of transmitting a sound signal to report an event represented by the sound signal.

In accordance with the present invention, the monitor system includes a monitor device, a first memory, a second memory and a speech circuit.

The monitor device is used for detecting at least one signal in response to the event.

The first memory is used for recording the at least one signal and processing the at least a signal by a manner of FIFO (first in, first out).

The second memory is used for pre-recording sound data corresponding to the at least one signal.

The speech circuit is used for transmitting the sound signal to report the event according to the sound data corresponding to the at least one signal.

In addition, when the at least one signal is detected by the monitor device, sounds of beep are transmitted automatically.

The at least one signal recorded and accessed in the first memory is controlled by a manner of FIFO (first in, first out).

When said sound signal is transmitted, a new signal is accessed simultaneously in the queue by a manner of FIFO (first in, first out).

In addition, the at least one signal is accessed by a controller.

The sound data are further accessed and transmitted to the speech circuit by the controller, thereby transmitting the sound signal to report the event.

The sound data pre-recorded in the second memory are accessed by the controller via software, and the sound signal reporting the event is transmitted with an on-line program.

The sound signal is changed to sounds of different sentences in different languages with an on-line program via a chip.

The present invention may best be understood through the following descriptions with reference to the accompanying drawings, in which:

DETAILED DESCRIPTION OF THE PREFERRED EMBODIMENTS

Figure 1:
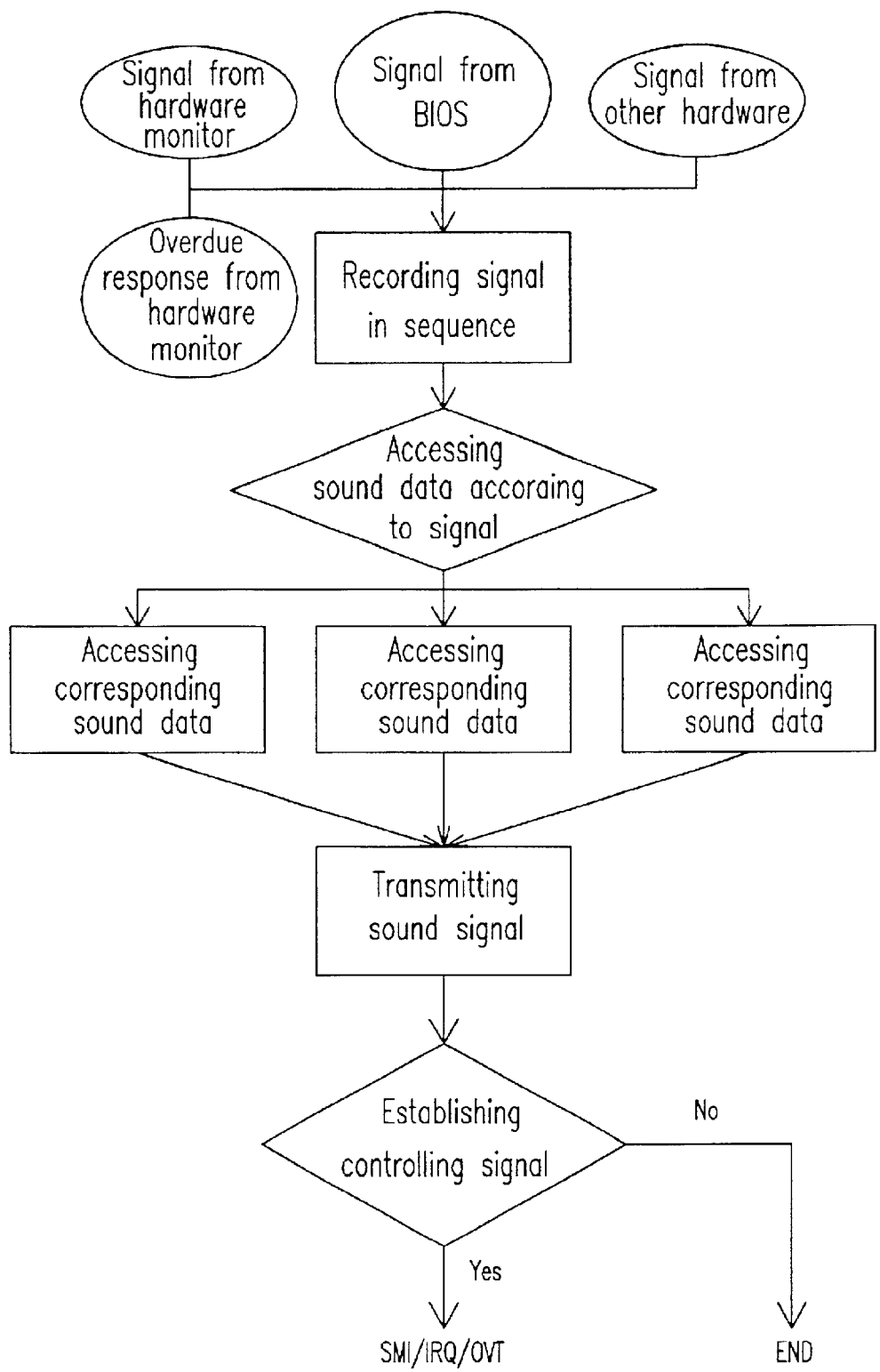
FIG. 1 is a flow chart illustrating the method provided by the present invention for transmitting a sound signal to report an event.

FIG. 1 is a flow chart illustrating the method provided by the present invention for transmitting a sound signal to report an event. When the computer has some failure, for example, the CPU is overheated, the motherboard is overheated, the CPU is undervoltaged, the motherboard is undervoltaged, the fan is out of order, or the memory is not accurately inserted into the motherboard, a sound signal is transmitted to report the problem corresponding to the sound signal.

When at least one signal represented by the overdue response of a hardware monitor or some failure is transmitted from a hardware monitor, a basic input/output system (BIOS), other hardware, or the combination thereof to a first recorder, the at least one signal is recorded in the first recorder in sequence. The at least one signal is accessed and the corresponding sound data pre-recorded in a second recorder is transmitted to a speech circuit. When the corresponding sound data is transmitted to the speech circuit, the at least one signal could be deleted automatically. Hence, the sound signal is transmitted to report the real problem in the computer. Certainly, a controlling signal could be transmitted from the speech circuit to other monitor system.

The first recorder is preferably a queue, and the at least one signal recorded and accessed in the queue is controlled in a manner of FIFO (first in, first out). When the sound signal is transmitted, a new signal could be accessed simultaneously in the queue by the manner of FIFO.

Figure 2:
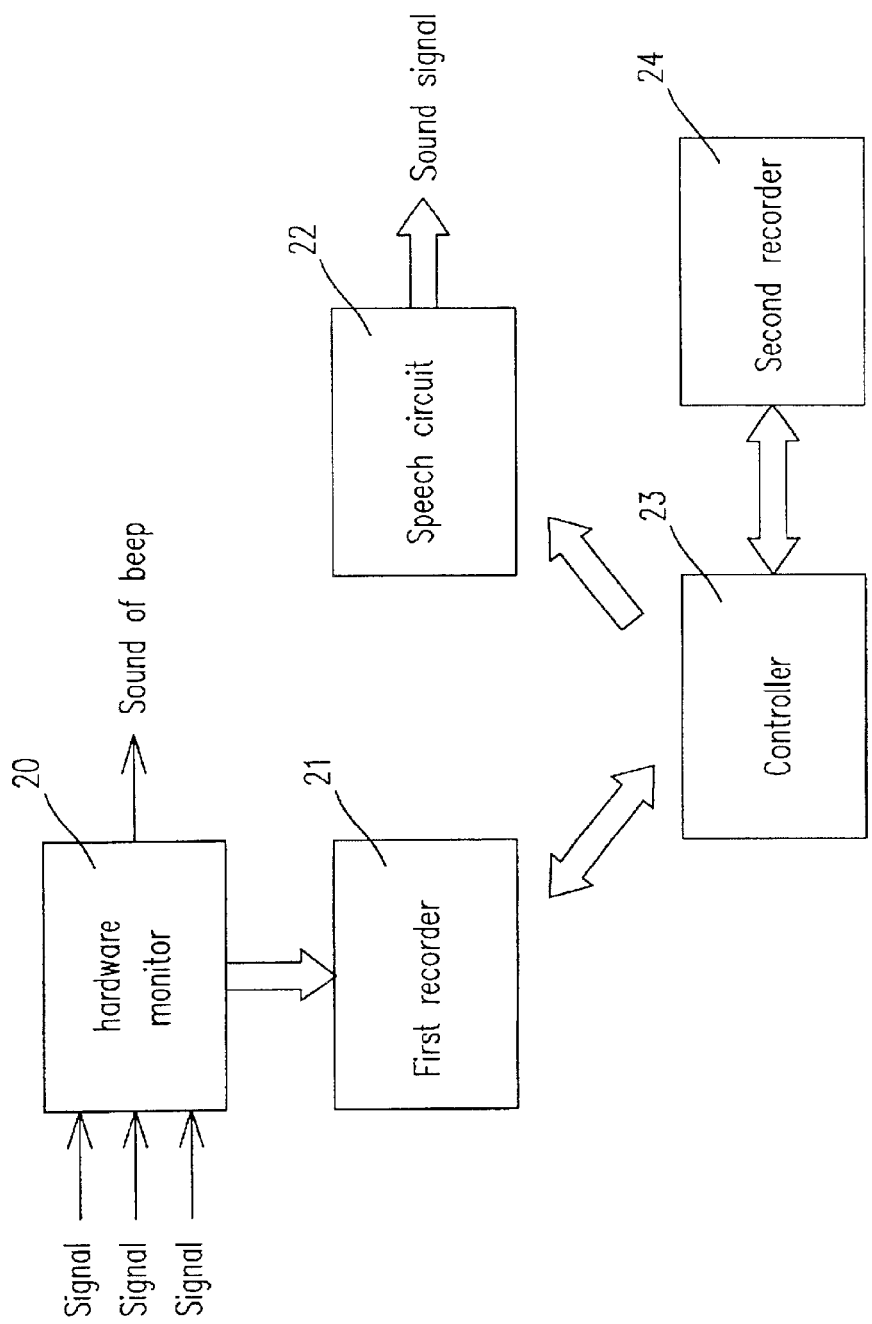
FIG. 2 is a schematic diagram showing the monitor system provided by the present invention for transmitting a sound signal to report an event represented by the sound signal.

FIG. 2 is a schematic diagram showing the monitor system provided by the present invention for transmitting a sound signal to report an event represented by the sound signal. A hardware monitor 20 is used for detecting the at least one signal and transmitting sounds of beep. A first recorder (queue) 21 is used for recording the at least one signal transmitted from the hardware monitor 20. The at least one signal is recorded in the first recorder (queue) 21 in a manner of FIFO (first in, first out). The sound data corresponding to the at least one signal is pre-recorded in a second recorder 24. A speech circuit 22 is used for transmitting a sound signal to report the real problem in the computer according to the corresponding sound data in the second recorder.

The at least one signal is accessed by a controller 23. The corresponding sound data are accessed by the controller 23 according to the accessed signal. The corresponding sound data are transmitted from the controller 23 to the speech circuit 22, and then the sound signal is transmitted to report the precise problem in the computer.

The second recorder 24 is preferably a memory. The sound data pre-recorded in the recorder (memory) 24 could be changed to the data presenting sentences in different languages with an on-line program via a chip.

Certainly, the second recorder 24 could be a hard disk. The sound data pre-recorded in the second recorder (hard disk) 24 are accessed by the controller 23 with software. The sound signal is transmitted with an on-line program to report the real problem in the computer.

Certainly, the present invention is not only applied in a computer, but also in any other alarm system for transmitting sound signals to report the corresponding emergency.

The present invention has the advantages as follows:
1. The present invention provides methods for transmitting sound signals to report the real and corresponding problem in the computer.
2. The monitor system provided by the present invention is workable even when the computer is down or turned off.
3. The present invention could not only be applied in a computer, but also in any other alarm system for transmitting sound signals to report the corresponding emergency.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A method for transmitting a sound signal to report an event represented by said sound signal, comprising steps of:
   receiving at least one signal in response to said event;
   recording said at least one signal in a first recorder in sequence; and
   accessing said at least one signal in sequence and reporting said event by transmitting said sound signal according to a corresponding sound data value selected, in response to the accessing of said at least one signal, from a plurality of sound data values that are pre-recorded in a second recorder, wherein each of the plurality of sound data values is associated with a corresponding signal, and said at least one signal recorded and accessed in said first recorder is controlled by a manner of FIFO (first in, first out).

2. The method according to claim 1, wherein said at least one signal is transmitted from one selected from a group consisting of a hardware monitor, a BIOS (basic input/output system), a motherboard and a combination thereof.

3. The method according to claim 1, wherein when said sound signal is transmitted, a new signal is accessed simultaneously in said first recorder by a manner of FIFO (first in, first out).

4. The method according to claim 1, wherein said first recorder is a first memory.

5. The method according to claim 4, wherein said first memory is a queue.

6. The method according to claim 1, wherein said event is one at least selected from a group consisting of an overheated CPU (central processing unit), a undervoltaged CPU, an overheated motherboard, a undervoltaged motherboard, failure of a fan disposed on said motherboard.

7. The method according to claim 1, wherein when said sound signal is transmitted, said at least one signal is automatically eliminated.

8. The method according to claim 1, wherein said at least one signal is accessed by a controller.

9. The method according to claim 8, wherein said sound data corresponding to said at least one signal and recorded in said second recorder are further accessed and transmitted to a speech circuit by said controller, thereby transmitting said sound signal to report said event.

10. The method according to claim 8, wherein said sound data recorded in said second recorder are accessed by said controller with software, and said sound signal reporting said event is transmitted with an on-line program.

11. The method according to claim 10, wherein said second recorder is a hard disk.

12. The method according to claim 10, wherein said second recorder is a second memory.

13. The method according to claim 12, wherein said sound signal is changed to sounds of different sentences in different languages with an on-line program via a chip.

14. A monitor system capable of transmitting a sound signal to report an event represented by said sound signal, comprising:

a monitor device for detecting at least one signal in response to said event;

a first memory for recording said at least one signal and processing said at least a signal by a manner of FIFO (first in, first out);

a second memory for pre-recording sound data corresponding to said at least one signal; and a speech circuit for transmitting said sound signal to report said event according to said sound data corresponding to said at least one signal.

15. The monitor system according to claim 14, wherein when said at least one signal is detected by said monitor device, sounds of beep are transmitted automatically.

16. The monitor system according to claim 14, wherein said at least one signal recorded and accessed in said first memory is controlled by a manner of FIFO (first in, first out).

17. The monitor system according to claim 14, wherein when said sound signal is transmitted, a new signal is accessed simultaneously in said first memory by a manner of FIFO (first in, first out).

18. The monitor system according to claim 14, wherein said at least one signal is accessed by a controller.

19. The monitor system according to claim 18, wherein said sound data are further accessed and transmitted to said speech circuit by said controller, thereby transmitting said sound signal to report said event.

20. The monitor system according to claim 19, wherein said sound data pre-recorded in said second memory are accessed by said controller via software, and said sound signal reporting said event is transmitted with an on-line program.

21. The monitor system according to claim 20, wherein said sound signal is changed to sounds of different sentences in different languages with an on-line program via a chip.

* * * * *